United States Patent [19]

Rice et al.

[11] Patent Number: 5,167,885
[45] Date of Patent: Dec. 1, 1992

[54] METHOD FOR MAKING SINTERED BODIES

[75] Inventors: Roy W. Rice, Alexandria, Va.; Rasto Brezny, Columbia, Md.

[73] Assignee: W. R. Grace & Co.-Conn., New York, N.Y.

[21] Appl. No.: 817,704

[22] Filed: Jan. 7, 1992

[51] Int. Cl.$^5$ .......................... B29C 67/00; B22F 3/00
[52] U.S. Cl. ......................................... 264/56; 264/71; 264/122; 264/125; 419/2; 419/23
[58] Field of Search ................... 264/56, 71, 122, 125, 264/126; 419/2, 6, 7, 23

[56] References Cited

U.S. PATENT DOCUMENTS

| | | | |
|---|---|---|---|
| 2,155,016 | 4/1939 | Kershaw | 264/122 |
| 3,730,706 | 5/1973 | Buescher et al. | 419/23 |
| 4,579,712 | 4/1986 | Mori | 419/9 |
| 4,601,997 | 7/1986 | Speronello | 502/263 |
| 4,628,042 | 12/1986 | Speronello | 502/263 |
| 4,698,317 | 10/1987 | Inoue et al. | 501/9 |
| 4,775,598 | 10/1988 | Jaeckel | 428/550 |
| 4,972,674 | 11/1990 | Yamada et al. | 60/323 |

FOREIGN PATENT DOCUMENTS

| | | |
|---|---|---|
| 01126281 | 5/1989 | Japan . |
| 01134022 | 5/1989 | Japan . |
| 1210805 | 4/1967 | United Kingdom . |

*Primary Examiner*—Mary Lynn Theisen
*Attorney, Agent, or Firm*—Steven Capella

[57] ABSTRACT

Monolithic bodies of sinterable materials are formed by a sintering process in which little or no shrinkage of the body occurs during sintering. In the method, large particles are placed in particle-to-particle contact with finer size powder particles at the interstices to form a molded shape which is then fired. During firing, the large particles are substantially stable, but the fine powder particles sinter to bond the large particles together. The method is especially useful for producing large and/or intricately shaped bodies. The method is also especially useful for making monolithic bodies using large hollow spherical particles.

21 Claims, No Drawings

METHOD FOR MAKING SINTERED BODIES

BACKGROUND OF THE INVENTION

Sintered materials, such as sintered ceramics, are finding ever widening structural application as parts in machines, engines and other industrial equipment.

Most sintered bodies are prepared by molding powder into a compacted shape which is then fired to sinter the powder. The sintering results in a monolithic body. This is the basic method used to make many structural ceramic bodies.

During sintering, the powder compact is densified (i.e., porosity is reduced) to improve the mechanical integrity and other physical properties of the resultant body. Densification is inherently accompanied by shrinkage of the compacted shape. The amount of shrinkage depends on the amount of density increase which is a function of the firing conditions, the original powder characteristics, and the powder packing. Typical production methods using sintering to achieve low porosity involve linear shrinkages on the order of at least about 15% from the original compacted shape.

Control and prediction of shrinkage are essential for industrial production of useful sintered articles or parts. The final dimensions of a sintered part are determined by the dimensions of the starting powder compact and the subsequent shrinkage of the compact during sintering. The degree of accuracy, uniformity, and repeatability in achievement of the required final sintered part dimensions directly affect the cost of production.

For sintered parts having final sintered dimensions larger than desired, machining to correct for dimensional variations (resulting from inadequate control and/or prediction of shrinkage) adds significantly to the product cost.

A more serious cost effect associated with sintering shrinkage occurs when sintered parts must often be rejected as scrap for failure to maintain the targeted dimensions (e.g. a section that is too narrow or a protrusion that is too short). Rejection for dimensional insufficiency may be caused not only by lack of accuracy of overall shrinkage, but also by serious distortion due to non-uniform shrinkage even if the proper average shrinkage is achieved. Besides causing shape distortion leading to insufficient dimensions, non-uniform shrinkage can result in serious residual stress or cracking in parts. Such stress or cracking may preclude any salvage of the parts by extra machining.

Shrinkage problems are greatly exacerbated as the dimensions and/or complexity of the shape increase. A 1% variation in shrinkage means a one centimeter dimensional variation over a one meter length. Complexity of shape presents challenges in maintaining uniformity of powder packing and uniformity of temperature exposure in subsequent sintering. Control of packing and sintering conditions are often critical to obtaining accurate, uniform, and reproducible shrinkage.

While the amount of shrinkage during sintering is often lower for bodies in which more residual porosity is desired (e.g. for thermal insulation purposes), these bodies still present challenging sintering problems. The uniformity and character of the residual porosity sought plays a key role in the resultant property balance of the product. Thus, for example, a uniform distribution of spherical pores provides significant reduction in properties such as thermal conductivity, but among the least reductions in stiffness and strength for a given porosity level. Accurate control of the original powder compact characteristics and the sintering conditions are often essential to achieving a desired porosity configuration in combination with other desired properties. While potentially reducing the amount of shrinkage, residual porosity also can make the body more susceptible to shrinkage variations due to porosity variations in the body.

SUMMARY OF THE INVENTION

The invention provides a method of fabricating monolithic bodies which overcomes various problems associated with sintering shrinkage and/or achievement of desired porosity configurations. By this method, a shape formed from particles undergoes little or no shrinkage during sintering yet still results in a monolithic body. The invention is especially suitable for making monolithic bodies from hollow particles (e.g. balloons, hollow spheres). The method of the invention is further especially suitable for producing monolithic bodies having good thermal insulating and mechanical properties.

The invention encompasses a method of making a monolithic body, the method comprising:
a) packing large particles and a powder having a finer particle size than the large particles into a mold such that the large particles are in substantial particle to-particle contact with each other and the powder particles are located in interstices of the packed large particles, thereby forming a shape, and
b) firing the shape to form a monolithic ceramic body, wherein:
  1) the large particles undergo essentially no shrinkage during the firing, and
  2) the powder undergoes sufficient sintering to bond the large particles together.

The packing step may be performed any suitable method such as by simultaneously molding a mixture of the large particles and the powder particles. Alternatively, the packing may be performed by first molding the large particles and subsequently depositing the powder particles in the large particles interstices. Conventional molding techniques such as slip casting, pressures casting, injection molding and gel casting may be used in the packing step.

The large particles should be of such a size that they do not undergo substantial shrinkage under the firing conditions needed to affect sintering of the finer powder particles. For embodiments using large hollow particles, the large hollow particles should have voids which are stable under the firing conditions used. Preferably, the large particles are substantially equiaxed or spherical. In one preferred embodiment, a distribution of large particles is used. A distribution of the particle size may also be used for the fine powder particles.

The materials used in the invention may be any known sinterable material such as metals, certain organic polymer materials, and ceramic materials. The ceramic material(s) used may be any conventional sinterable ceramic system. Preferred embodiments use hollow ceramic particles as the large particles.

DETAILED DESCRIPTION OF THE INVENTION

The method of the invention involves:
a) packing large particles and a finer particle size ceramic powder in a mold thereby forming a shape, and b) firing the shape to form a monolithic body.

The large particles are preferably packed in substantial particle-to-particle contact throughout the entire mold volume. The fine powder particles are preferably located at interstices of the packed large particles.

The packing step may be performed by any suitable method. For example, a mixture of the large particles and the powder particles may be simultaneously molded using a suitable technique such as injection molding, pressure casting or gel casting. Alternatively, the large particles may be initially packed in particle-to-particle contact with the powder particles being subsequently deposited into the interstices of the packed large particles. In the latter method, the powder is preferably deposited by passing a slip through packed large particles.

If a simultaneous packing technique is used, then the relative volume fractions of large particles and fine powder particles must be selected to ensure particle-to-particle contact for the large particles. Thus, if the volume fraction of fine powder particles is too great, the powder may prevent substantial portions of the large particles from achieving contact with the other large particles.

Any known expedients may be used to assist the packing process. For example, the mold may be subjected to vibration during the packing step to increase packing density and/or the degree of contact between the large particles. Preferably, a binder is used to provide strength to the molded shape before firing. The binder may be included in the mixture to be simultaneously molded. In the two step packing embodiment, the binder is preferably added with the powder particles.

The resultant packed shape is then fired whereby the powder particles undergo sintering. The firing conditions (e.g. time, temperature, atmosphere, etc.) selected may vary depending on the composition of the material, the particle sizes used, the desired strength, etc. Preferably, the firing conditions are selected so that little or no shrinkage of the large particles occurs. Since the large particles used are much larger than those used in normal sintering methods, the firing conditions used may be the typical conditions for sintering the small powder particles of the specific material(s) involved.

For a part with a linear dimension of about one meter, preferably the total shrinkage that occurs on firing is about 1% or less. Conditions which result in a slight amount of shrinkage (e.g. 1%) may be desirable if additional strength is needed in the part produced. Generally, firing conditions can be selected whereby the part undergoes virtually no measurable shrinkage yet the small powder particles sinter to bond the large particles together to form a monolithic body. Such conditions may be desirable for producing large complex parts or high porosity parts.

The large particles should be large enough that they do not sinter under the firing conditions used in step b). For ceramic materials, the large particles are preferably at least about 100 microns in diameter, more preferably about 100–2000 microns. Preferably, a distribution of large particle sizes is used to achieve greater particle-to-particle contact between the large particles and increased packing density. The large particles may either be fully dense particles or hollow particles or combinations thereof.

The use of large hollow particles allows the production of monolithic bodies with tailored porosity characteristics as well as improved mechanical properties for a given level of porosity. The voids in the large hollow particles should be substantially stable under the firing conditions used.

The large particles may be of any suitable shape provided they do not shrink substantially during sintering. Preferably, the large particles are substantially equiaxed, i.e. the large particles have a ratio of maximum diameter to minimum diameter for each particle averaging about 1.0–2.0. Substantially spherical particles (i.e. maximum diameter: minimum diameter for each particle of about 1.0–1.2) are generally most preferred since they provide for easier and more uniform packing. Preferably, the hollow particles are substantially spherical, e.g. balloons or microspheres.

The fine powder particles should be small enough to fit into the interstices of the packed large particles. The powder particle size should also be small enough that the powder will sinter during the firing step b) and thus bond the large particles together. For ceramic materials, the powder particles preferably have diameters of about 10 microns or less. Preferably, a distribution of powder particle sizes may be used to provide increased density in the unfired shape. Particle sizes intermediate between large particles and the small powder particles may be additionally used to promote increased packing density provided that the intermediate size particles do not prevent the large particles from achieving substantial particle-to-particle contact.

The materials used in the invention may be any known sinterable material such as metals, certain organic polymer materials, and ceramic materials. The ceramic material(s) used may be any conventional sinterable ceramic system.

For low thermal expansion and/or heat insulating applications, preferred ceramic materials are selected from the group consisting of zirconium aluminum titanate (ZAT), aluminum titanate, mullite, cordierite, sodium zirconium phosphate (NZP), magnesium aluminum silicate, and lithium aluminum silicate (LAS). The large particles, for the low thermal expansion and/or heat insulation applications, are preferably in the form of hollow spheres.

If desired, compatible combinations of different ceramic materials may be used. For example, mixtures of large particles of compatible differing compositions may be used. Also, the small powder particles may have a composition different from the large particles so long as they are compatible. A further option is the incorporation of highly refractory particles, fibers, or whiskers to improve the overall properties of the ceramic part produced.

The invention method may be used to form components for combustion engines and engine exhaust systems, as well as for producing conventional ceramic parts.

The invention is further illustrated by the examples given below. The invention is not limited to the specific details of the examples.

EXAMPLE 1

Presintered mullite hollow spheres (2 mm) were vibrated into a tube mold (approx. 6"×2½" with ¼" wall) to optimize their packing. The inner wall of the mold was made of a screen. A slurry of 60 wt. % mullite powder (2–4 μm) in water was passed through the spheres and allowed to drain through the screen. The slurry also contained 1 wt. % Darvan 821A as a dispersing aid and 2.5 wt. % polyvinyl alcohol as a binder. Slurry was retained by capillary tension within the sphere contacts however open pore channels remained between the spheres. The tube was dried and sintered at 1500° C. for 2 hours. The spheres were sintered together but no detectable shrinkage occurred during firing.

EXAMPLE 2

Hollow multiple spheres were vibrated into the mold of example 1 to maximize packing. The spheres were approximately 1 mm in size. 100g of the 60 weight % mullite slurry mentioned previously was mixed with 20 g of fine mullite hollow spheres (~150 μm). This slurry was used to completely infiltrate the pores between the large mullite spheres. The body was dried and sintered to 1500° C. for 2 hours without shrinkage. The outer surface of the body was smooth but the part contained about 60% total porosity.

What is claimed is:

1. A method of making a monolithic body, said method comprising:
   a) packing large, particles and a powder having a finer particle size than said large particles into a mold wherein said powder is deposited in interstices of said packed large particles and said large particles are in substantial particle-to-particle contact with each other, thereby forming a filled shape, and
   b) firing said shape to form said monolithic body, wherein:
      1) said large particles undergo essentially no shrinkage during said firing, and
      2) said powder undergoes sufficient sintering to bond said large particles together.

2. The method of claim 1 wherein at least a portion of said large particles are hollow.

3. The method of claim 1 wherein said large particles and said powder comprise materials selected from the group consisting of metals, sinterable polymers, and ceramic materials.

4. The method of claim 2 wherein said large particles and said powder particles comprise materials selected from the group consisting of metals, sinterable polymers, and ceramic materials.

5. The method of claim 3 wherein said large particles and said powder comprise ceramic materials.

6. The method of claim 5 wherein said large particles have diameters of at least about 100 microns and said powder particles have diameters of about 10 microns or less.

7. The method of claim 1 wherein said large particles have a ratio of maximum to minimum diameter for each particle averaging about 1.0-2.0.

8. The method of claim 7 wherein said ratio averages about 1.0-1.2.

9. The method of claim 4 wherein said large particles and said powder comprise ceramic materials.

10. The method of claim 8 wherein said large particles have diameters of at least about 100 microns and said powder particles have diameters of about 10 microns or less.

11. The method of claim 10 wherein said large particles have a ratio of maximum to minimum diameter for each particle averaging about 1.0-2.0.

12. The method of claim 11 wherein said ratio averages about 1.0-1.2.

13. The method of claim 1 wherein said shape undergoes about 1% or less shrinkage during firing step b).

14. The method of claim 4 wherein said large particles consist essentially of hollow spheres.

15. The method of claim 9 wherein said large particles have diameters in the range of 100-2000 microns.

16. The method of claim 9 wherein said large ceramic particles comprise a ceramic material selected from the group consisting of mullite, cordierite, zirconium aluminum titanate, aluminum titanate, sodium zirconium phosphate, magnesium aluminum silicate, and lithium aluminum silicate.

17. The method of claim 1 wherein said packing step comprises:
   i) forming a mixture comprising said large particles, said fine powder and a binder; and
   ii) filling a mold with said mixture to form said shape.

18. The method of claim 17 wherein said filling step is performed by injection molding, pressure casting, or gel casting.

19. The method of claim 1 wherein said packing step comprises:
   i) packing said large particles into a mold;
   ii) forming a slip comprising said powder and a binder; and
   iii) passing said slip through said packed large particles to deposit said powder in said interstices thereby forming said shape.

20. The method of claim 19 wherein said mold is vibrated during step i).

21. The method of claim 16 wherein said large particles consist essentially of hollow spheres.

* * * * *